US 8,834,756 B2

(12) United States Patent
Todesco et al.

(10) Patent No.: US 8,834,756 B2
(45) Date of Patent: Sep. 16, 2014

(54) COMPRESSED INJECTION MOLDING

(71) Applicant: Meiban International Pte. Ltd., Singapore (SG)

(72) Inventors: Pierre Louis Todesco, Singapore (SG); Carol Su Lin Goh, Singapore (SG)

(73) Assignee: Meiban International Pte. Ltd., Singapore (SG)

( * ) Notice: Subject to any disclaimer, the term of this patent is extended or adjusted under 35 U.S.C. 154(b) by 0 days.

(21) Appl. No.: 13/845,648

(22) Filed: Mar. 18, 2013

(65) Prior Publication Data

US 2013/0224508 A1  Aug. 29, 2013

Related U.S. Application Data

(63) Continuation of application No. PCT/IB2011/054753, filed on Oct. 25, 2011.

(30) Foreign Application Priority Data

Oct. 26, 2010 (GB) .................................... 1017998.4

(51) Int. Cl.
| B29C 45/16 | (2006.01) |
|---|---|
| B29C 45/76 | (2006.01) |
| B29C 45/77 | (2006.01) |
| B29C 45/56 | (2006.01) |
| B29C 45/80 | (2006.01) |

(52) U.S. Cl.
CPC ....... B29C 45/76 (2013.01); *B29C 2945/76575* (2013.01); *B29C 2945/76591* (2013.01); B29C 45/77 (2013.01); B29C 45/561 (2013.01); *B29C 2945/76545* (2013.01); *B29C 2945/76769* (2013.01); *B29C 2945/76391* (2013.01); *B29C 2945/76658* (2013.01); B29C 45/16 (2013.01); *B29C 2945/7627* (2013.01); *B29C 2945/76859* (2013.01); *B29C 2045/5665* (2013.01); *B29C 2945/76083* (2013.01); *B29C 2945/76765* (2013.01); *B29C 2945/76615* (2013.01); B29C 45/80 (2013.01)
USPC ........................ 264/40.1; 264/40.5; 264/328.7

(58) Field of Classification Search
CPC ............. B29C 2045/5665; B29C 2945/76083; B29C 2945/7627; B29C 2945/76391; B29C 2945/76575; B29C 2945/76591; B29C 2945/76615; B29C 2945/76765; B29C 2945/76769; B29C 45/77
USPC ..................................... 264/40.1, 40.5, 328.7
See application file for complete search history.

(56) References Cited

U.S. PATENT DOCUMENTS

| 3,608,004 | A | * | 9/1971 | Borisuck et al. .............. 264/244 |
|---|---|---|---|---|
| 4,682,943 | A | * | 7/1987 | Schomblond ................. 425/130 |
| 4,836,960 | A | * | 6/1989 | Spector et al. ................ 264/2.2 |
| 5,015,426 | A | * | 5/1991 | Maus et al. ................... 264/40.5 |
| 5,922,266 | A | * | 7/1999 | Grove ......................... 264/297.2 |
| 5,968,439 | A | * | 10/1999 | Grove ......................... 264/297.2 |
| 6,267,576 | B1 |  | 7/2001 | Matsubara et al. |
| 6,645,417 | B1 | * | 11/2003 | Grove ......................... 264/328.8 |

FOREIGN PATENT DOCUMENTS

| JP | 7068601 | 3/1995 |
|---|---|---|
| JP | 8174616 | 7/1996 |
| JP | 2001 018258 | 1/2001 |
| WO | WO 2012/056395 | 5/2012 |

OTHER PUBLICATIONS

PCT Search Report, Meiban International Pte. Ltd. et al., PCT/IB2011/054753, Mail Date—Jun. 20, 2012.
PCT International Preliminary Report on Patentability, Meiban International Pte. Ltd. et al., PCT/IB2011/054753, Date of Completion of Report—Jan. 24, 2013.

* cited by examiner

*Primary Examiner* — Jill Heitbrink
(74) *Attorney, Agent, or Firm* — Saile Ackerman LLC; Stephen B. Ackerman

(57) ABSTRACT

The application provides a molding apparatus. The molding apparatus comprises a first mold-defining member together with a second mold-defining member, one or more channels, and one or more moveable cores. The first mold-defining member together with the second mold-defining member defines an internal cavity. The channels comprise inlets for receiving molten resin and outlets to the internal cavity. The moveable cores are moveable between a first position and a second position, wherein the moveable core in the second position reduces a volume of the internal cavity and closes the channel outlets. The moveable core is also independently moveable with respect to the first mold-defining member and with respect to the second mold-defining member.

11 Claims, 11 Drawing Sheets

COMPRESSED INJECTION MOLDING

Figure 1:
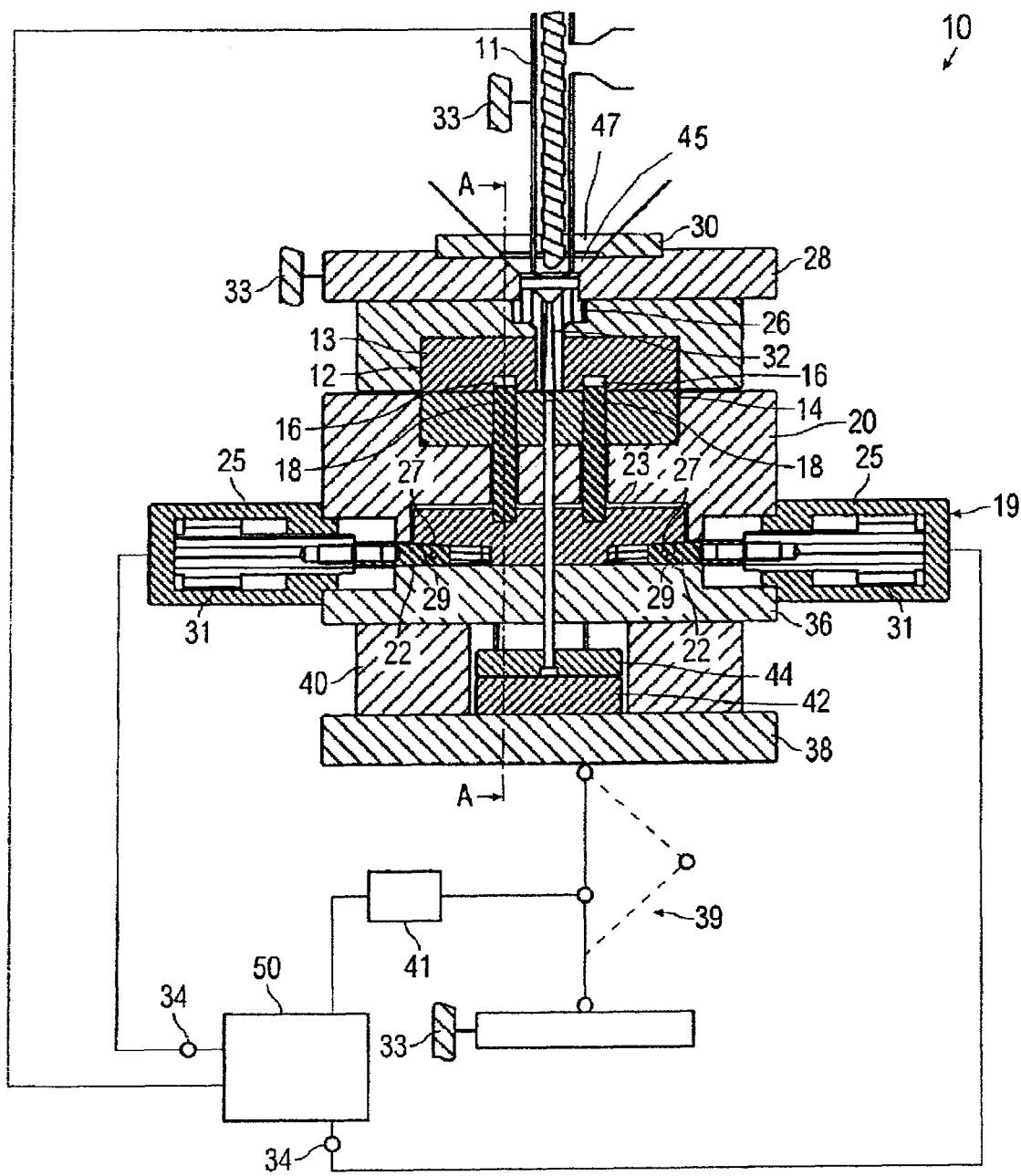

This application relates to a method and to an apparatus for injection molding.

Injection molding is widely used for manufacturing a variety of parts that ranges from small components to entire body panels of cars. Injection molding uses thermoplastic and thermosetting plastic materials to produce plastic parts.

The molding process includes a step of feeding the plastic material into a heated barrel, where the plastic material is also mixed. The heated barrel converts the plastic material into a molten or a semi-molten state. After this, the molten plastic material is extruded into a mold cavity such that the plastic material fills essentially the entire mold cavity. The mold often comprises steel or aluminum, which has been shaped using precision-machinery such that the mold cavity forms various features of the desired plastic part. The mold is afterward cooled, wherein the cooling hardens and solidifies the molded plastic to form the desired plastic part.

It is an object of the application to provide an improved injection-molding machine.

The application provides a molding apparatus for producing injection molding.

The molding apparatus includes a first mold-defining member together with a second mold-defining member, one or more channels, and one or more moveable cores.

The first mold-defining member can be provided as a moveable member while the second mold-defining member can be provided as a stationary member. Especially, first mold-defining member can be provided by a moveable die and/or a moveable core and the second mold-defining member can be provided by a stationary die with an opening.

In an open position, the first mold-defining member is placed apart or away from the second mold-defining member. In contrast, in a closed position, the first mold-defining member is placed adjacent to the second mold-defining member, such that the first mold-defining member and the second mold-defining member define an internal cavity. The internal cavity is used for receiving molten resin, wherein the internal cavity is used for shaping the molten resin into a pre-determined shape. The molten resin refers to a liquid or semi-liquid state of the resin.

The channel comprises a channel inlet for receiving molten resin and a channel outlet for delivering the molten resin to the internal cavity.

The moveable core is moveable between a first position and a second position. The first position can correspond to a normal cavity volume position while the second position can correspond to a reduced cavity volume. The moveable core in the second position reduces a volume of the internal cavity. In this position, a surface of the moveable core also closes the channel outlet and is contact with the channel outlet. This allows the moveable core to cover the channel outlet for cutting off the delivery of the molten resin to the internal cavity in order to compress the molten resin within the internal cavity.

The moveable core is also independently moveable with respect to or in reference to the first mold-defining member and with respect to the second mold-defining member. Put differently, the moveable core moves independent of the first mold-defining member and of the second mold-defining member.

In addition, a mold ejector pin is provided within the moveable core. The mold ejector pin is used in the open position of the first and the second mold-defining members to remove the shaped resin from the said mold-defining members. In contrast, the moveable core is used in the closed position of the said mold-defining members.

The moveable core has an advantage of providing a simple mechanism to compress the molten resin in the mold cavity.

The channel can comprise one or more grooves in the first mold-defining member. The groove can serve as a channel for receiving molten resin and for delivering the molten resin to the internal cavity. In other words, the grooves may form the channel.

Similarly, the channel can comprise one or more grooves in the second mold-defining member. The grooves in the second mold-defining member can also be partly complementary to the groove in the first mold-defining member. The groove provides a simple manner of providing resin channels.

A part of the moveable core can be provided in a hollow portion of the first or of the second moveable mold-defining member.

A hydraulic transversal wedge mechanism can be provided for longitudinally actuating the moveable core. The first and the second mold-defining member forms a mold assembly in which one of the first and the second mold-defining member is provided as a moveable member. The moveable core moves in the longitudinal direction of the molding assembly or in the direction of a moveable member.

By using a small angle, the wedge mechanism can provide a large compressive force on the mold cavity.

The transversal wedge mechanism can include a positional sensor for measuring the position of the transversal wedge mechanism. The measurement can be used to improve operations of the injection-molding machine. According to the application, the wedge has an inclination of less than 45 degrees and translates a smaller pressure of the piston or wedge into a larger pressure at the moveable core. Due to the relationship "energy=force times distance" a larger distance of the wedge is also translated into a smaller distance of the moveable core. Thereby, a measurement of the wedge movement provides a greater accuracy.

A hydraulic die clamping device can also be provided for longitudinally actuating the first mold-defining member or the second mold-defining member. The hydraulic die clamping device often includes knee lever mechanism with a hydraulic piston, which is easy to implement.

The hydraulic die clamping device can include a pressure sensor for measuring pressure exerted by the actuation of the hydraulic die clamping device.

The application provides a molding machine. The molding machine includes the above-mentioned molding apparatus, a mold injection device, and a machine bed.

In operation, the machine bed provides a support for the molding machine and the mold injection device. The mold injection device is used for preparing resin for injecting to the molding apparatus. The molding apparatus is used for shaping the resin that it receives from the mold injection device.

The molding machine can include a control unit. This control unit has a port for controlling the volume of molten resin injected by the mold injection device. The controlling is done in accordance to a positional data of a moveable core of the molding apparatus, when a mold assembly of the molding apparatus is in a closed position. The control unit provides a feedback between the molding apparatus and the mold injection device such that the molding machine can improve its operations.

The application provides a method of producing an injection molding. The molding relates to an object that is produced by molding. The method comprises a step of injecting a molten resin into an internal cavity of a die assembly. The molten resin flows into the internal cavity via a outlets of one or more resin channels.

A moveable core is then advanced into the internal cavity. This is done such that the volume of the internal cavity is reduced and such that a surface of the moveable core closes the outlet of the resin channel. The surface of the moveable core covers or blocks the outlet of the resin channel in order to cut off the flow of the molten resin into the internal cavity. According to the application, the moveable core is moved past the one or more outlets of the one or more resin channels and thereby the outlet are blocked. The blocking of the resin outlet and the reducing of the volume of the internal cavity often compresses the molten resin within the internal cavity.

This compression also moves the molten resin away from a separation line or area that is defined by the die assembly. The die assembly has a first mold-defining member and a second mold-defining member. In a closed position, the first mold-defining member and the second mold-defining member defines the separation line that may have an area for holding a thin layer of excess resin material. The moving of the resin away from the separation line reduces or eliminates this formation of excess material. The excess material is also called a burr or flash. Put differently, the end position of the moveable core is positioned away from the separation line such that no or little burr exists on the molding.

This manner of compressing the molten resin has an advantage of being simple to implement and efficient as essentially no loss of pressure to the channels occurs.

The moveable core can be advanced such that the volume of the internal cavity is reduced only after the molten resin being injected into the internal cavity. Put differently, the moveable core can be advanced after the molten resin layer is completed. The moveable core can also be advanced while the molten resin is being injected. This provides flexibility in the implementation of this process.

The advancing of the moveable core into the internal cavity often exerts a molding pressure on the molten resin, which is contained within the internal cavity of the die assembly. The molding pressure shapes the molten resin into the desired form.

The application also provides a method of producing an object by injection molding. The molded object refers to an object, which is also known as product or article, that is an object produced by molding.

In particular, the application discloses a molded plastic part that comprises a first resin layer and a second resin layer which are provided by a first channel of a molding apparatus, and an intermediate resin layer that is provided by a second channel of the molding apparatus. Therein, the first resin layer, the second resin layer, and the intermediate resin layer are provided such that the intermediate resin layer is adjacent to the first resin layer and to the second resin layer and such that the intermediate layer separates the first resin layer from the second resin layer. In particular, the first resin layer, the second resin layer and the intermediate resin layer may be compressed by the molding apparatus. Herein, the first and second channel may be identical but preferably the first and second channels are different.

Furthermore, the application discloses a molded plastic part which comprises a first component layer and a second component layer which is provided by a first channel of a molding apparatus, and an intermediate component layer that is provided by a second of the molding apparatus. The intermediate component layer is provided adjacent to the first component layer and to the second component layer such that the intermediate component layer separates the first component layer from the second component layer. In particular, the first component layer, the second component layer and the intermediate component layer may be compressed by the molding apparatus. Herein, the first and second channel may be identical but preferably the first and second channels are different.

According to the application, the different layers may have different physical properties which are adjusted to specific applications. In particular, the first component layer and/or the second component layer and/or the intermediate component layer may comprise a filler material.

At least one of the filler material of the layers may comprise insulating particles. This is especially advantageous if the resin or plastic is an intrinsic electrical conductor.

Furthermore, at least one filler material may comprise electrically conductive particles and or at least one of the filler materials may comprise semi-conductive particles. The electrically conductive or the semi-conductive particles may comprise, for example, conductive soots with carbon compounds such as PP, PE and EVA or semi-conducting tin- or antimony oxides on mica or on ceramic needles. Moreover, the conductive particles may also comprise conductive polymers.

According to the application, a conductive resin layer may be used to absorb electromagnetic radiation. The electrically properties of the conductive, insulating or semi-conductive component layers can furthermore be adjusted to provide specific electrical components such as transistors, diodes, capacitors etc.

At least one of the resin layers or component layers may comprise a material such as a polyamide which is capable of absorbing or conducting liquids, such as water or electrolytic solutions. According to the application, the liquid permeability of the component layers may be used alone or in combination with the electric properties to provide an electric battery. In particular, one or more of the filler materials may comprise electrolytic particles such as salt ions, metal oxide ions, gas ions etc.

The different resin or component layers may also be made with different thermal expansion coefficients to obtain a defined bending force under heating of the plastic part.

The volume of molten resin being injected into the internal cavity of the die assembly can be changed advantageously by adjusting the volume of the molten resin according to a previous or an earlier end positional data of a moveable core of a die or mold assembly.

The method includes a step of injecting a predetermined volume of a molten resin into an internal cavity of a die assembly by a mold injection apparatus. The pre-determined volume relates to a desired volume of the final molded object.

A pre-determined pressure is then applied on the molten resin within the internal cavity by a moveable core. This pressure acts to shape the molten resin according the internal shape of the internal cavity. In particular, a pre-determined pressure may be achieved according to the application by using a feedback loop in which the moveable core is advanced by a pre-determined distance and a pressure is measured. Those steps are repeated until the pre-determined pressure is reached within a pre-determined margin of accuracy. Hence the pre-determined pressure may differ slightly from the measured pressure.

After this, a property of the moveable core is measured. In one embodiment, the property comprises the position of the moveable core that corresponds to the application of the pre-determined pressure on the molten resin. This positional data of the moveable core provides an indication of the volume of the molten resin in the internal cavity, which is the volume of the desired molding. According to another embodiment, the property of the moveable core comprises a pressure that is applied to the moveable core.

In addition, the method according to the application may comprise advancing an ejector pin into a region of the last resin layer. This may be done before, during or shortly after the last resin layer is formed. In a removing step, the ejector pin is moved out of the mold cavity together with the molded part. Advantageously, the ejector pin comprises a circular groove to improve the attachment to the last resin layer. In a finishing step, the ejector pin is removed from the last resin layer.

When the measured position of the moveable core is essentially different from a pre-determined or desired position, this indicates the volume of molten resin injected into the internal cavity is different from the desired volume. For quality and cost reasons, the volume of injected molten resin should be accurate. If the volume of injected molten resin is too high, too much molten resin is used to produce the molding. This would translate into higher material cost and possibly molding with excessive thickness. On the other hand, if the volume of injected molten resin is too low, the molding has walls that are too thin.

The predetermined volume of a molten resin is later adjusted for subsequent steps of mold injection to eliminate this volume difference.

This method provides an easy or accurate way of controlling a volume of the molten resin since the method uses a feedback loop for the control. This is different from other methods that just focus on providing an accurate volume of injected molten resin.

The step of applying the pre-determined pressure on the molten resin can comprise a step of advancing the moveable core by a pre-determined distance. The pressure being applied to the molten resin is afterward measured. The advancing of the moveable core and the measuring of the pressure are repeated when the measured pressure is less than a pre-determined pressure.

The application provides a bi-injection molding machine. The molding machine includes a molding apparatus, a first mold injection device, a second mold injection device, a machine bed, and a control unit.

The molding apparatus includes a first mold-defining member and a second mold-defining member, a first channel, a second channel, at least one moveable core and a mechanism. In contrast, the first channel comprises a first channel inlet and a first channel outlet. Similarly, the second channel comprises a second channel inlet and a second channel outlet. The control unit comprises a first port and a second port. The mechanism comprises a positional sensor.

In use, the first mold injection device is used for providing molten first resin to the molding apparatus. Similarly, the second mold injection device is used for providing the molten second resin to the molding apparatus. This allows the molding apparatus to produce a molded part that comprises two types of resin.

The first mold-defining member together with the second mold-defining member defines an internal cavity in a closed state of the molding apparatus.

The first channel inlet is used for receiving molten first resin from the first mold injection device and the first channel outlet is used for delivering the molten first resin to the internal cavity.

Similarly, the second channel inlet is used for receiving molten second resin from the second mold injection device and the second channel outlet is used for delivering the molten second resin to the internal cavity.

The moveable core is moveable between a first position and a second position. The moveable core in the second position reduces a volume of the internal cavity. The moveable core in the second position also closes the first channel outlet and closes the second channel outlet. Moreover, the moveable core is independently moveable with respect to the first mold-defining member and with respect to the second mold-defining member.

The mechanism is intended for actuating the moveable core. The machine bed supports the molding apparatus, the first mold injection device, and the second mold injection device.

The first port is used for controlling the first mold injection device according to a first positional data of the molding apparatus. Likewise, the second port is used for controlling the second mold injection device according to a second positional data of the molding apparatus.

This arrangement allows the molding machine to produce a molded part with multiple layers of resin. The molded part includes an intermediate layer that is placed adjacent to an upper layer and to a lower layer wherein the upper layer is not interconnected or adjacent to the lower layer.

In the embodiments of FIGS. 1 to 13, the first outlet is spaced apart from the second outlet. Put differently, the first outlet is not placed inside the second outlet and the second outlet is not placed inside the first outlet.

The channel often comprises at least one groove in the first mold-defining member. The channel can comprise at least one groove in the second mold-defining member, the groove in the second mold-defining member being at least partly complementary to the groove in the first mold-defining member in that the grooves are adjacent, on opposite sides and have matching shapes.

The moveable core can be partly provided in the first mold-defining member and can be partly provided in the second mold-defining member.

The molding machine can include a device for actuating the first mold-defining member, wherein the device can comprise a pressure sensor.

The application provides a method of producing an injection molding. The method comprises a step of providing a layer of first resin and a step of providing a layer of second resin, which is also known as a second resin layer, that is provided next to the first resin layer.

The step of providing of the layer of first resin comprises
  a step of injecting a predetermined first volume of a molten first resin into an internal cavity of a die assembly, wherein the molten first resin flows into the internal cavity via a first outlet of a first resin channel,
  a step of forming the layer of first resin by advancing a moveable core into the internal cavity to apply a pre-determined first pressure on the molten first resin, such that the volume of the internal cavity is reduced, wherein the advancing of the moveable core is done such that the moveable core closes the first outlet of the first resin channel, and
  a step of measuring a first position of the moveable core.

In the same manner, the step of providing of the layer of second resin comprises
  a step of injecting a predetermined second volume of a molten second resin into the internal cavity of the die assembly, wherein the molten second resin flows into the internal cavity via a second outlet of a second resin channel, the molten second resin is provided next to the first resin,
  a step of forming layer of second resin by advancing the moveable core into the internal cavity to apply a predetermined second pressure on the molten second resin, such that the volume of the internal cavity is reduced, the advancing of the moveable core is done such that the moveable core closes the second outlet of the second resin channel, and a step of measuring a second position of the moveable core. The method further comprises, a step of adjusting the predetermined first volume of the molten first resin for a subsequent injecting when the position of the moveable core is different from a predetermined first position, and a step of adjusting the predetermined second volume of the molten second resin for a subsequent injecting when the position of the moveable core is different from a predetermined second position.

The application provides a molded plastic part. The molded plastic part includes a first resin layer and a second resin layer, as well as an intermediate resin layer.

A first mold injection device provides the first resin layer via a first channel of a molding apparatus and a second resin layer. Similarly, a second mold injection device provides the intermediate resin layer via a second channel of the molding apparatus.

The first resin layer, the second resin layer, and the intermediate resin layer are provided such that the intermediate resin layer is adjacent to the first resin layer and to the second resin layer, and that the intermediate layer separates the first resin layer from the second resin layer. In other words, the first resin layer is not connected to the second resin layer but is separated by the second resin layer via the intermediate layer.

The molding apparatus can compress the first resin layer, the second resin layer and the intermediate resin layer. Such a compression can cause the compressed layer to have a uniform density.

The application also provides a molded plastic part. The molded plastic part includes a first component layer and a second component layer, as well as an intermediate component layer.

A first mold injection device via a first channel of a molding apparatus provides the first component layer and a second component layer. Likewise, a second mold injection device via a second of the molding apparatus provides the intermediate component layer.

The intermediate component layer is provided adjacent to the first component layer and to the second component-layer such that the intermediate component layer separates the first component layer from the second component layer.

The first component layer can comprise a first polymer with a first-filler, the second component layer can comprise a second polymer with a second-filler, and the intermediate component layer comprises an intermediate polymer an intermediate-filler. The respective polymers and fillers may be different or some or all of them may be equal.

One of the first filler, the second filler and the intermediate filler can comprise electrically insulating particles, conductive particles, or semi-conductive particles. These fillers allow the component layers to have different properties.

Furthermore, the component layers may also have different indices of refraction, different light absorption coefficients or different reflectivities for providing a material with customized optical properties. According to the application, the index of refraction may increase from layer to layer, for example to provide a light cavity for a plastic laser with luminescent semiconducting polymers.

Figure 2:
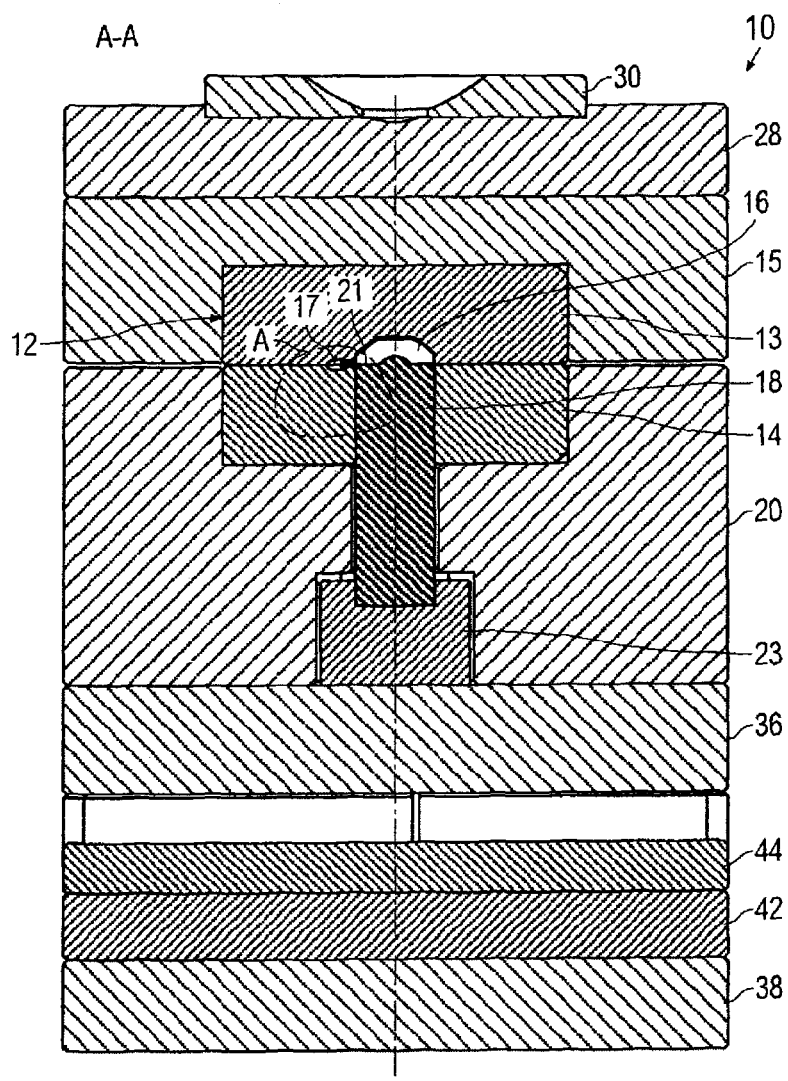
Figure 3:
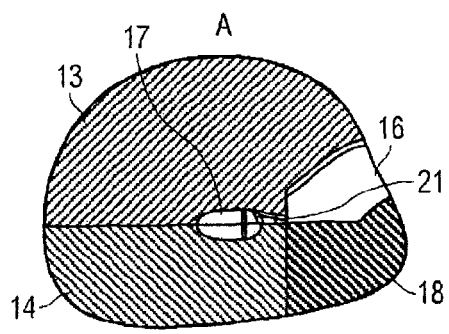
Figure 4:
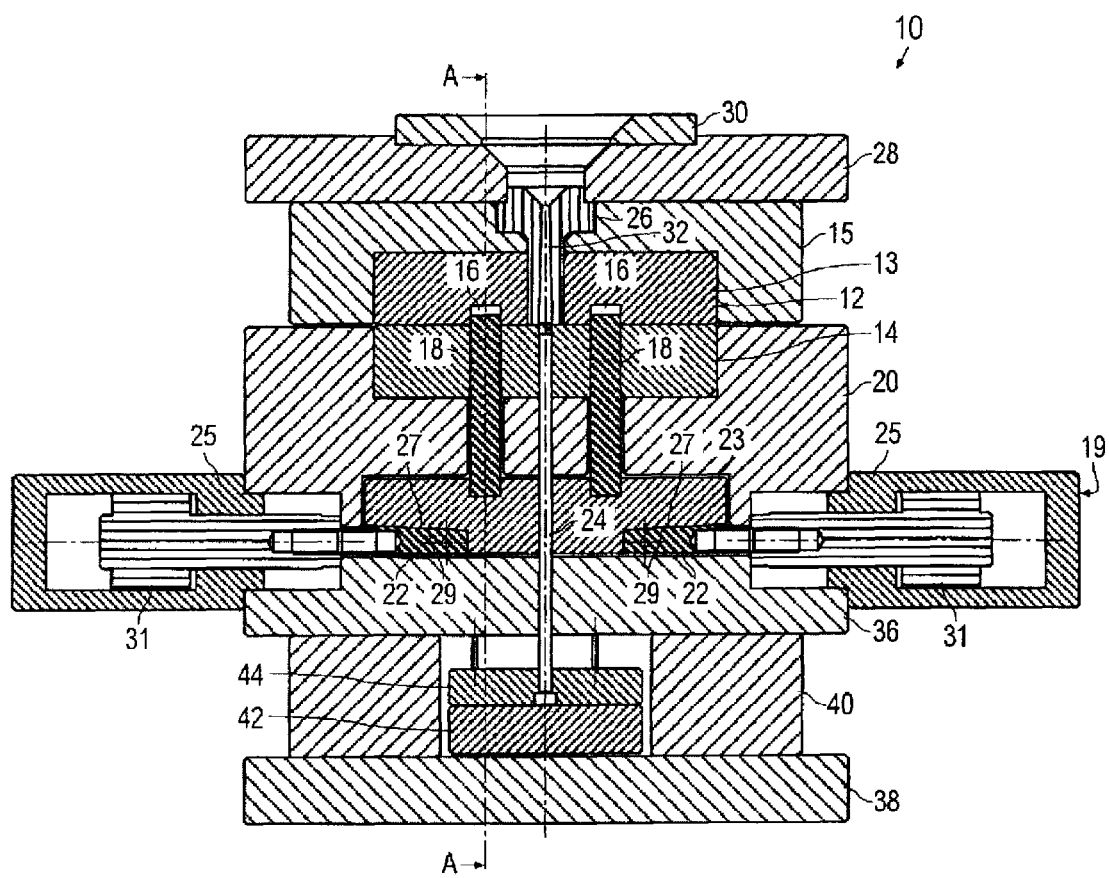
Figure 5:
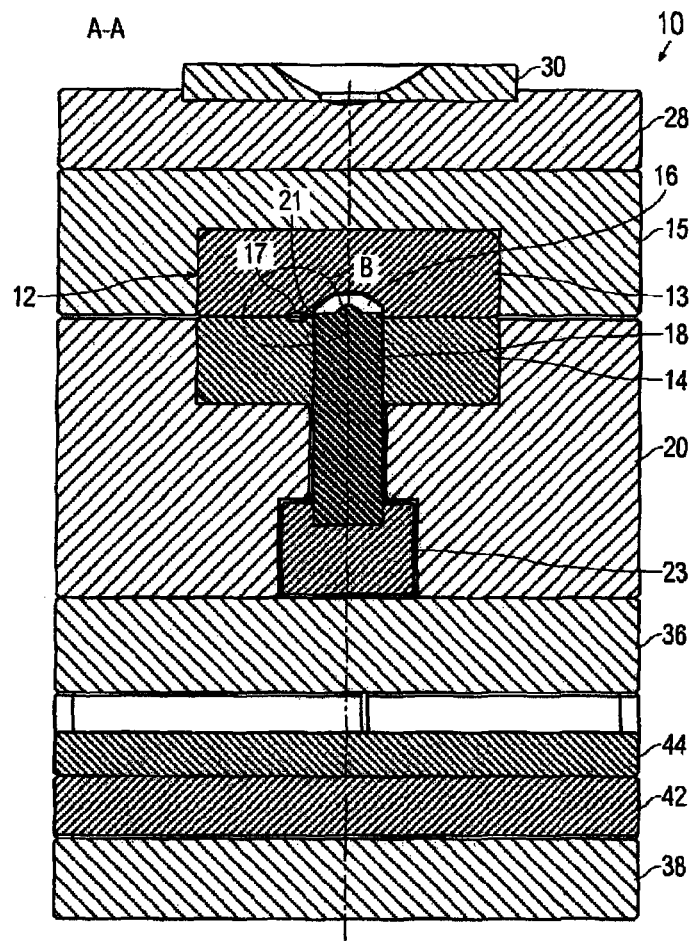
Figure 6:
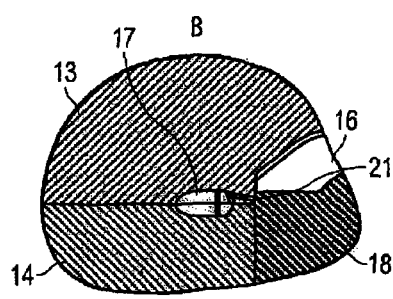
Figure 7:
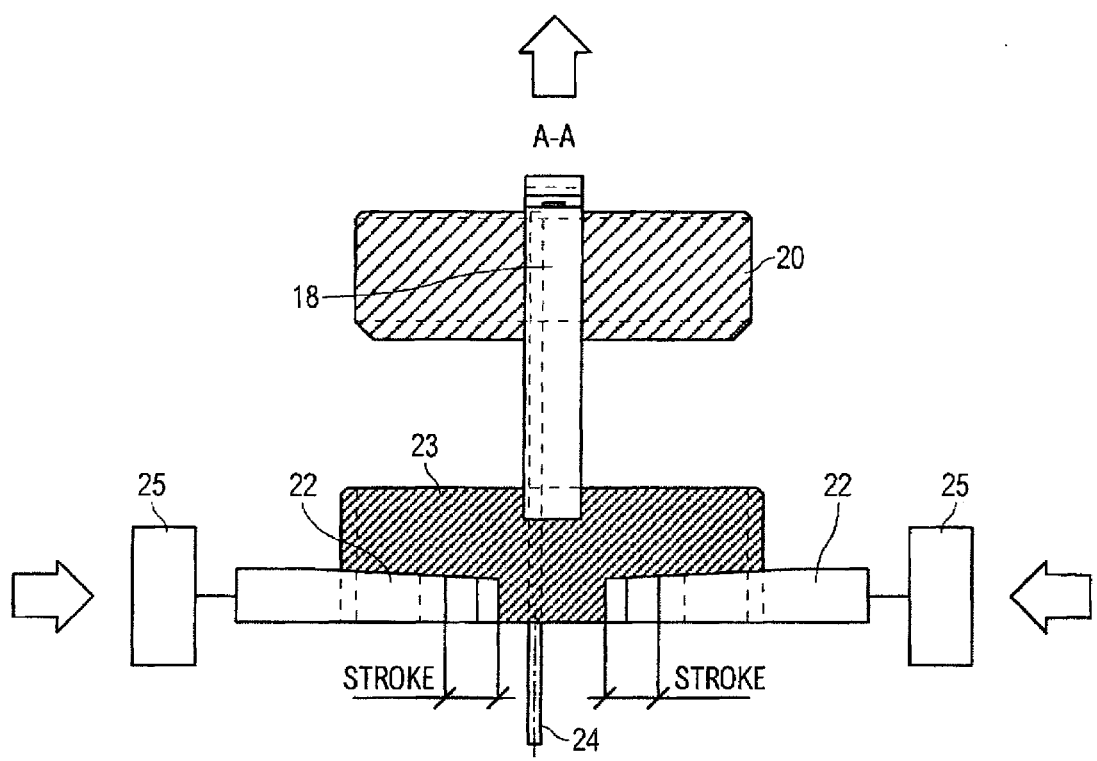
Figure 8:
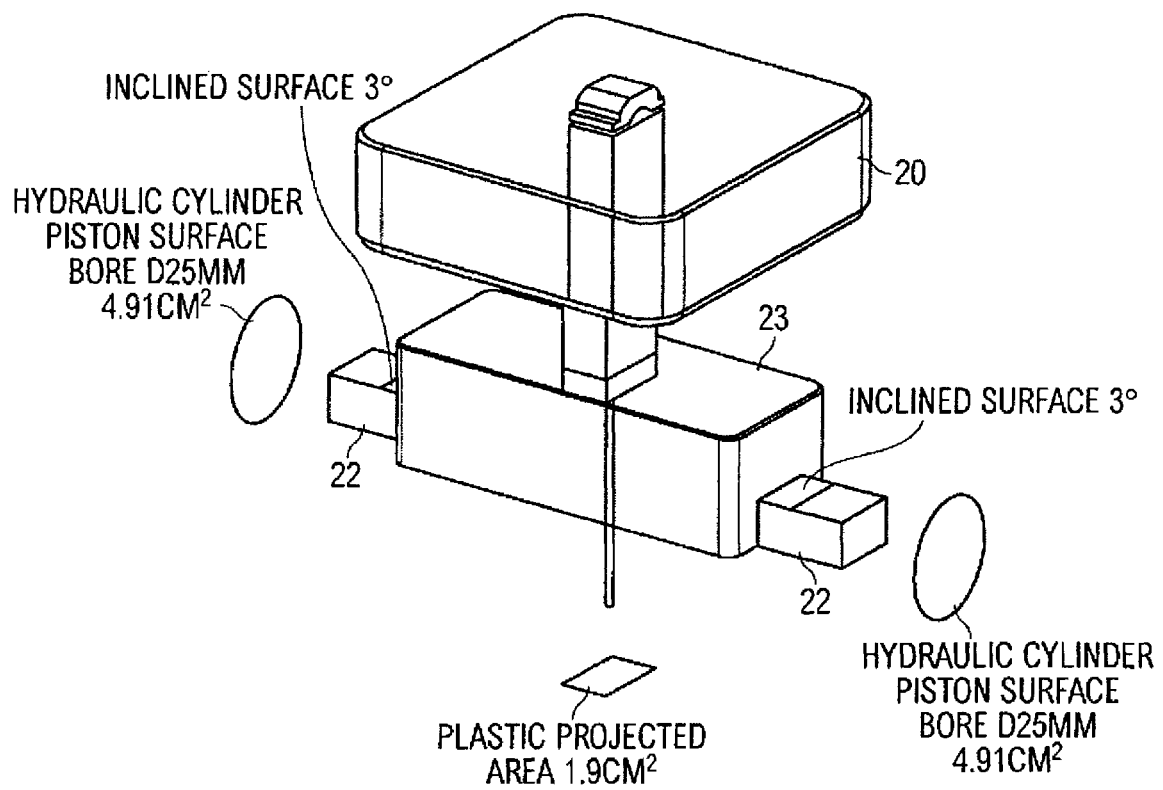
Figure 9:
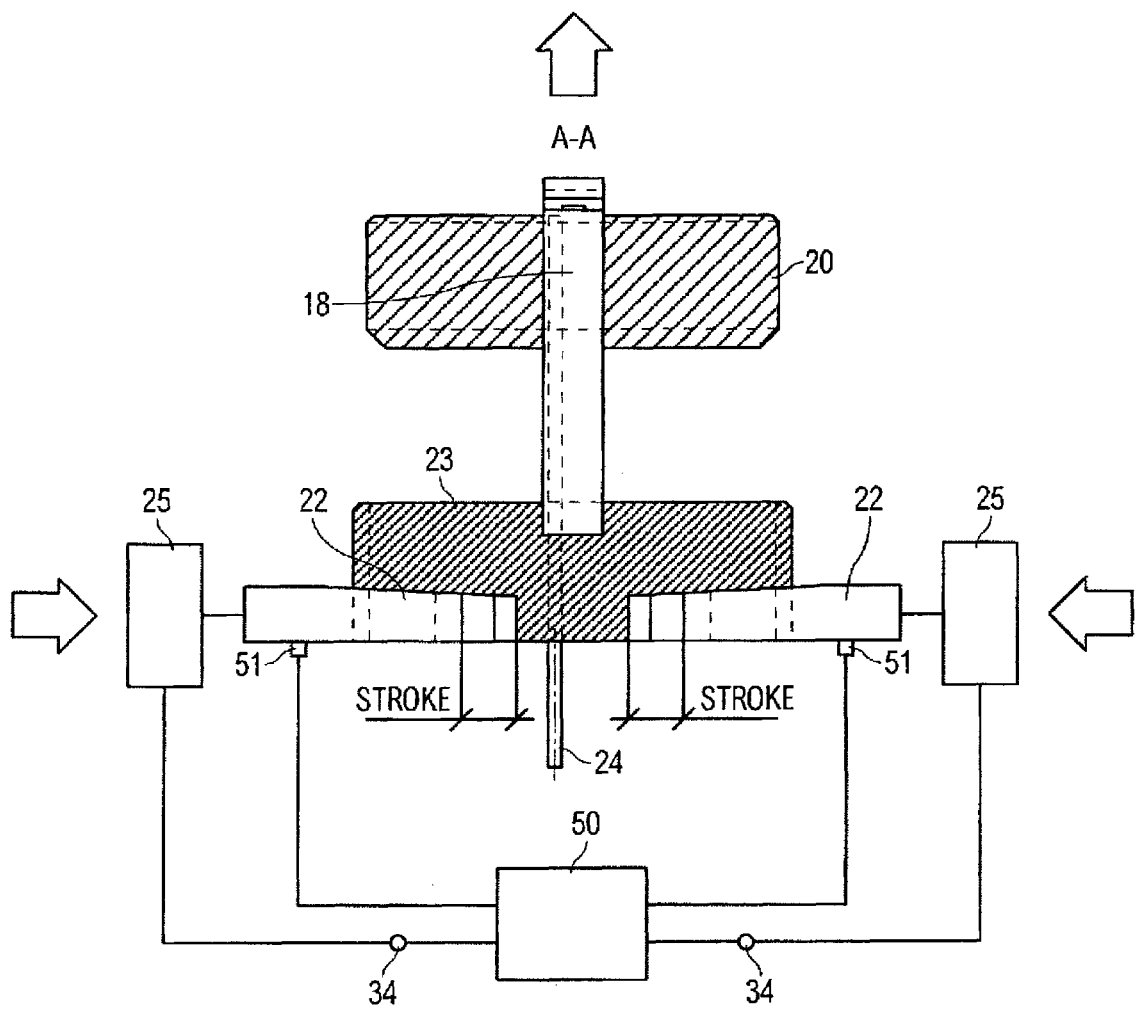
Figure 10:
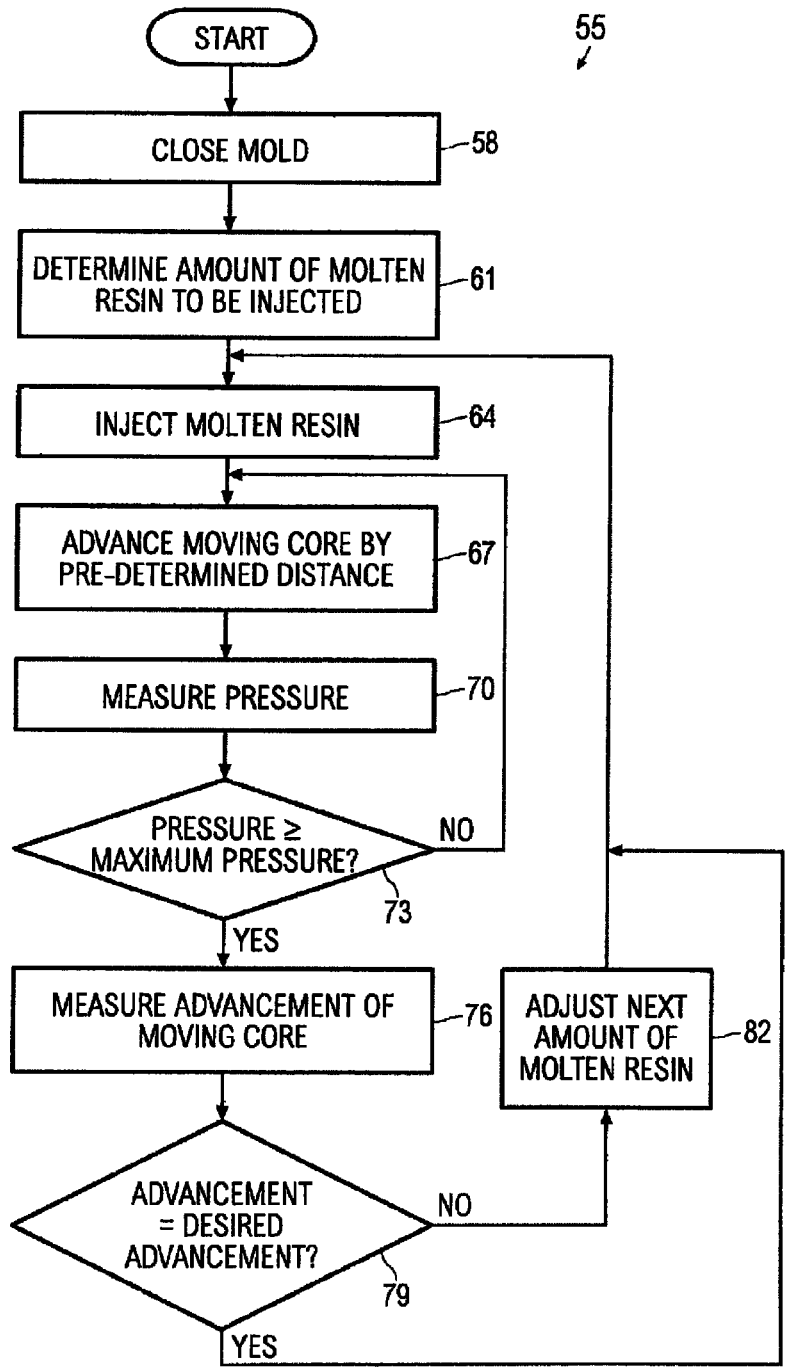
Figure 11:
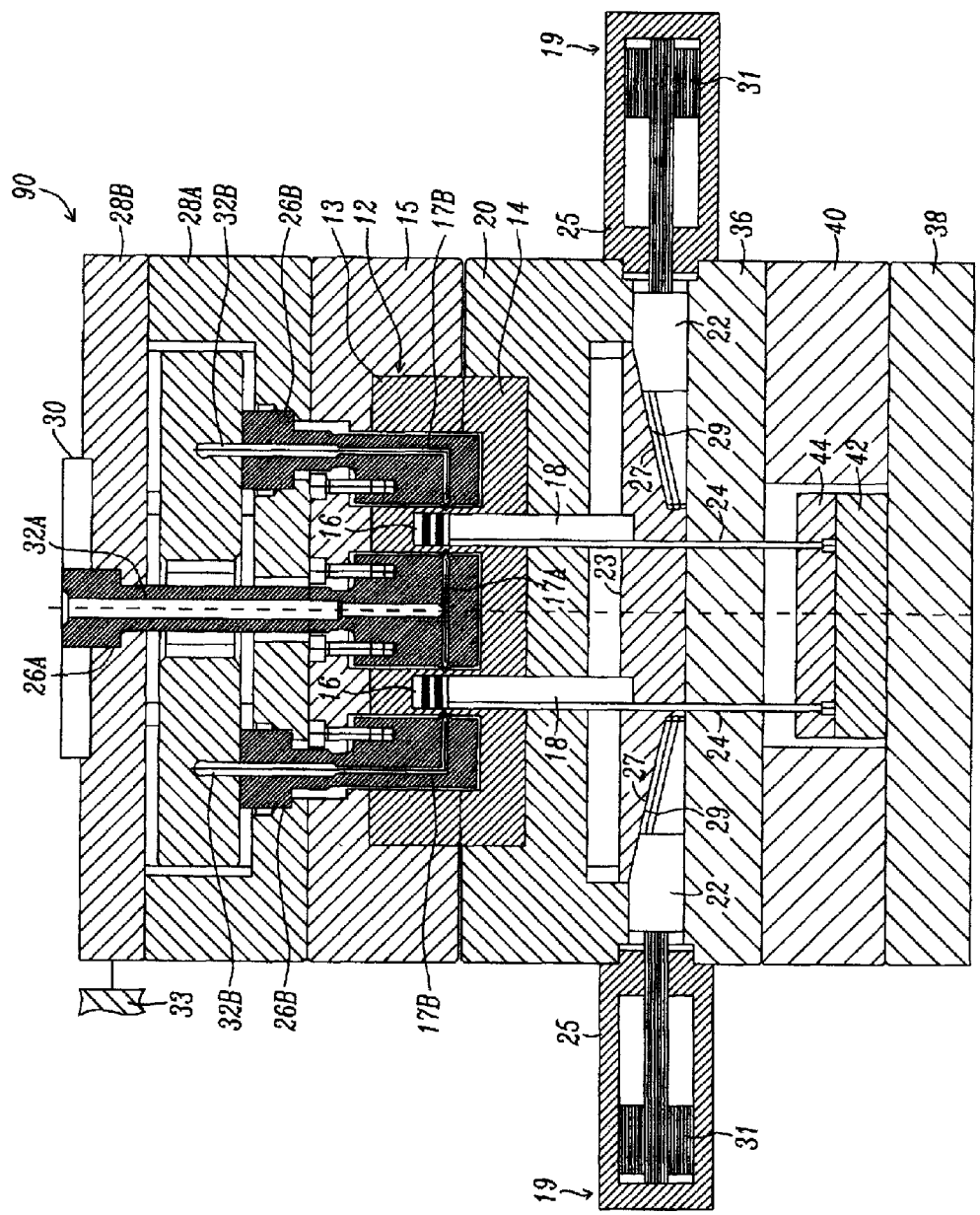
Figure 12:
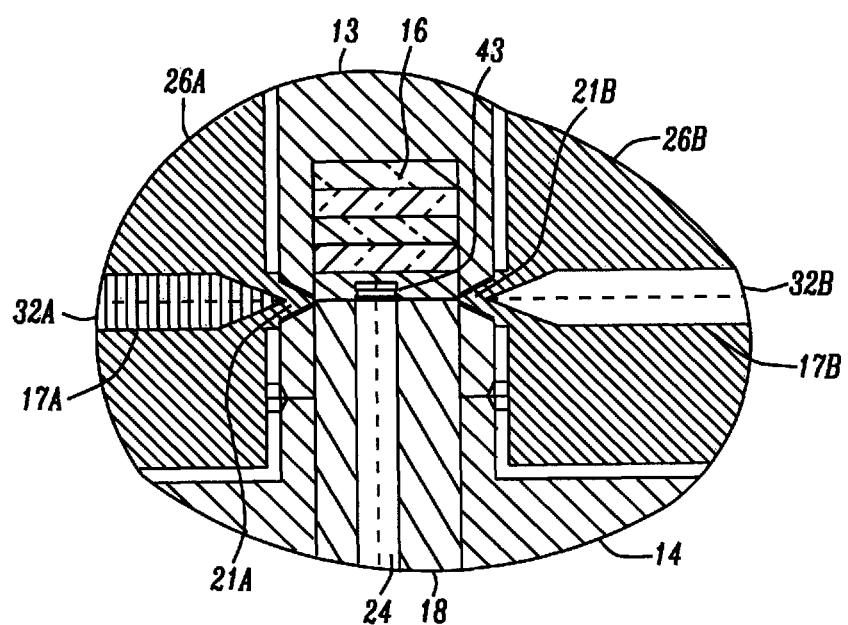
Figure 13:
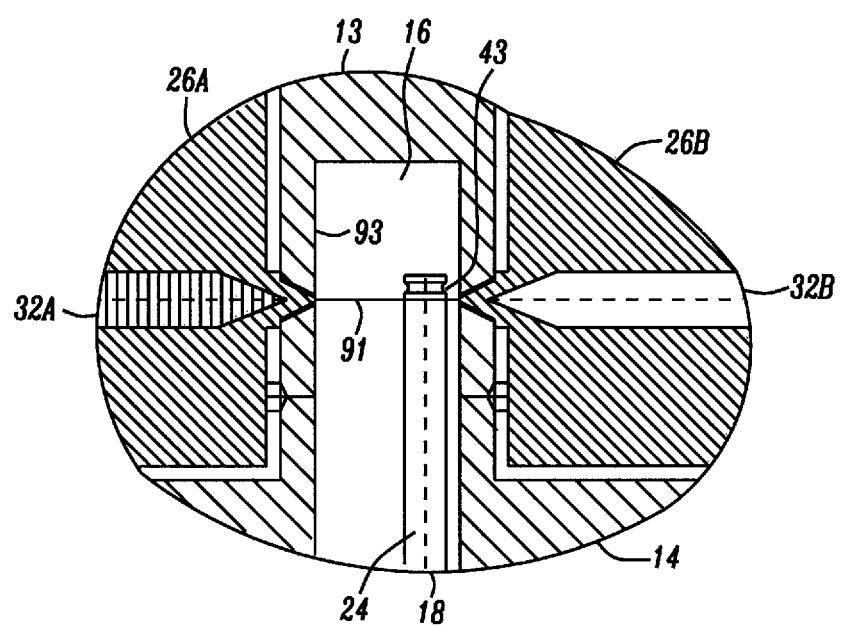

FIG. 1 illustrates a cross-sectional top view of an embodiment of an improved injection-molding machine in a first position, FIG. 2 illustrates a side cross-sectional view of the injection-molding machine of FIG. 1, FIG. 3 illustrates an expanded cross-sectional view of a part of the injection-molding machine of FIG. 2, FIG. 4 illustrates a cross-sectional top view of the injection-molding machine of FIG. 1 in a second position, FIG. 5 illustrates a side cross-sectional view of the injection-molding machine of the FIG. 4, FIG. 6 illustrates an expanded cross-sectional view of a part of the injection-molding machine of FIG. 5, FIG. 7 illustrates a schematic drawing of a compression mechanism for the injection-molding machine of FIG. 1, FIG. 8 illustrates a perspective view of the compression mechanism of the injection-molding apparatus of FIG. 7, FIG. 9 illustrates an embodiment of the compression mechanism of FIG. 7, FIG. 10 illustrates a process flow chart for the compression mechanism of FIG. 9, FIG. 11 illustrates a cross-sectional top view of an embodiment of a bi-injection molding machine in a closed position, FIG. 12 illustrates an expanded cross-sectional view of a part of the bi-injection molding machine of FIG. 11, and FIG. 13 illustrates a part of the bi-injection molding machine of FIG. 12, wherein the mold cavity is empty.

In the following description, details are provided to describe embodiments of the application. It shall be apparent to one skilled in the art, however, that the embodiments may be practiced without such details.

Some parts of the embodiments, which are shown in the Figs. below, have similar parts. The similar parts may have the same names or similar part numbers. The description of such similar parts also applies by reference to other similar parts, where appropriate, thereby reducing repetition of text without limiting the disclosure.

FIG. 1 shows an injection-molding machine 10. The injection-molding machine 10 includes a die assembly 12 that operates with a mold injection apparatus 11, which is fixed to a machine bed 33. The term "die" is also known as "mold" or "mould".

The die assembly 12 includes a stationary die 13 and a moveable die 14. The moveable die 14 is positioned next to the stationary die 13. In a closed position, the moveable die 14 and the stationary die 13 define two internal mold cavities 16, as shown in FIG. 1.

The stationary die 13 and the moveable die 14 also comprise grooves that form channels 17 when the die assembly 12 is in the closed position. This is illustrated in FIGS. 2 and 3. The channels 17 are also known as runners.

As can be seen in FIG. 1, the stationary die 13 is placed next to a first major surface of a cavity plate 15 and it is removably taken up and received by the cavity plate 15. The cavity plate 15 is also called a stationary die receptacle. Both the cavity plate 15 and the stationary die 13 have central openings for taking up a runner insert 26 that is placed into the central portion of the cavity plate 15 and into the central portion of the stationary die 13. The runner insert 26 has a hollow core, which is provided as a channel or a runner 32. The runner 32 is connected to the channels 17. These connections are not shown in the figures.

One end of the channels 17 is adapted to receive molten resin from the mold injection apparatus 11 through the runner 32. Another end of the channels 17 is connected to the respective cavities 16 via outlets 21, which terminate at an outlet orifice in the stationary die 13, as can be best seen in FIGS. 2 and 3.

As can be seen in FIG. 1, a second major surface of the cavity plate 15, which is opposite to the first major surface of the cavity plate 15, is placed next to a first major surface of a clamping plate 28, which is fixed to the machine bed 33. The clamping plate 28 is also called a stationary plate. The cavity plate 15 is attached to the clamping plate 28.

A second major surface of the clamping plate 28, which is opposite to the first major surface of the clamping plate 28, is placed next to an injection head insert 30. The clamping plate 28 is attached to the injection head insert 30. The injection head insert 30 has a central opening 47, is aligned with a central opening 45 in the clamping plate 28.

Referring to the moveable die 14, it has multiple hollow cores in which longitudinally moveable cores 18 are inserted. The moveable cores 18 are attached to a moving apparatus 19. The moveable cores 18 are also inserted inside a core plate 20 that is adapted to keep the longitudinal axe of the moveable cores 18 essentially horizontal and essentially parallel to each other while allowing the moveable cores 18 to move back and forth essentially in the horizontal direction. The core plate 20 is also called a guiding core.

The moveable die 14 is placed next to a first major surface of a moveable die receptacle that is provided by the core plate 20. A second major surface of the moveable die receptacle 20, which is opposite to the first major surface of the moveable die receptacle 20, is attached to the moving apparatus 19.

Referring to the moving apparatus 19, it includes wedges 22 and a lifting block 23 together with hydraulic pistons 25. The wedges 22 are located next to the lifting block 23 while the lifting block 23 is in contact with the moveable cores 18.

The wedges 22 are secured to piston rods 31 of the hydraulic pistons 25, wherein the piston rods 31 are adapted to move the respective wedges 22 towards the lifting block 23 or away from the lifting block 23.

The wedges 22 have inclined surfaces 27 that correspond to inclined surfaces 29 of the lifting block 23. The inclined surfaces 27 and 29 are inclined in relation to the moving direction of the moveable cores 18. Put differently, the inclined surfaces 27 and 29 are not perpendicular to the moving direction of the moveable cores 18. These inclined surfaces 27 and 29 are also in contact with each other, wherein the inclined surfaces 27 of the wedges 22 contact the lifting block 23 via its inclined surfaces 29, as illustrated in FIG. 1.

The inclined surfaces 27 and 29 are also adapted such that the lifting block 23 would be positioned farther from the die assembly 12 when the wedges 22 are positioned away or farther from the lifting block 23. Similarly, the lifting block 23 would be positioned near to the die assembly 12 when the wedges 22 are positioned toward or nearer to the lifting block 23.

The lifting block 23 is guided by the core plate 20 such that the lifting block 23 is moveable essentially in the horizontal direction while it slides on its inclined surfaces 29 against the inclined surfaces 27 of the wedges 22. This can be seen from FIG. 1.

The hydraulic pistons 25 are attached to an intermediary plate 36 of a die clamping apparatus. The intermediary plate 36 is also called a die clamping moveable plate. The die clamping apparatus is not shown in the figures. The intermediary plate 36 is attached to a base clamp plate 38 via a support ring 40 and to the moveable die receptacle 20. The base clamp plate 38 is also called a main moveable plate.

The base clamp plate 38 is also connected to a knee lever mechanism 39 that is actuated by a hydraulic piston 41. The knee lever mechanism 39 is fixed to the machine bed 33.

An ejector pin 24 is attached to a superior ejector plate 44. The superior ejector plate 44 is also called an ejector actuation plate. An inferior ejector plate 42, which is secured to the base clamp plate 38, blocks the superior ejector plate 44. The inferior ejector plate 42 is also called a blocking plate. The ejector pin 24 is inserted in a central hollow core of the intermediary plate 36, in a central hollow core of the lifting block 23, a central hollow core of the moveable die receptacle 20, and a central hollow core of the moveable die 14. As can be seen best in FIGS. 12 and 13, the ejector pin 24 comprises a circular groove 43 which is located at a side of the mold cavity 16.

The mold injection apparatus 11, the hydraulic piston 25, and the hydraulic piston 41 are connected to a control unit 50 via hydraulic lines that include pressure sensors 34.

In operation, the die assembly 12 is moveable between an open position and a closed position. In the open position, the moveable die 14 is positioned apart or away from the stationary die 13. In contrast, in the closed position, the stationary die 13 is positioned next to the moveable die 14 such that the stationary die 13 and the moveable die 14 define the internal mold cavities 16, as shown in FIG. 1.

The moveable cores 18 are moveable between a reduced volume position and a normal volume position. The normal volume position is illustrated in FIGS. 2 and 3 while the reduced volume position is illustrated in FIGS. 5 and 6.

When the die assembly 12 is in the closed position and when the moveable cores 18 are in the normal volume position, the moveable cores 18 do not block the outlets 21 of the channels 17. This is better seen in FIG. 3.

When the moveable cores 18 shift to the reduced volume position, the moveable cores 18 block and cover the outlets 21 of the channels 17 such that any molten resin within the outlet 21 is in contact with the circumferential surface of the moveable cores 18. The blocking prevents the molten resin within the channels 17 from flowing out of the runner outlets 21 into the mold cavities 16.

This is better seen in FIG. 6. In this reduced volume position, the moveable cores 18 also reduce the volume of the die cavities 16, thereby compressing the molten resin, which is take up therein.

In use, the moveable die 14 is positioned by the intermediary plate 36, which is moved by the base clamp plate 38.

The base clamp plate 38 is in turn moved by the knee lever mechanism 39, which is actuated by the hydraulic piston 41. The control unit 50 controls the hydraulic piston 41.

The intermediary plate 36 can be actuated such that it moves away from the stationary die 13 or towards the stationary die 13. When the intermediary plate 36 moves away from the stationary die 13, the moveable die 14 also moves away from the stationary die 13 to enter into the open position of the die assembly 12. Similarly, when the intermediary plate 36 is actuated toward the stationary die 13, the moveable die 14 also moves toward the stationary die 13 to assume the closed position of the die assembly 12.

The mold injection apparatus 11 is used for receiving resin pellets. The received resin pellets are intended for kneading and for plasticizing by a screw mechanism of the mold injection apparatus 11 in a manner that is controlled by the control unit 50. The plasticizing process includes a step of including plasticizers into the resin pellets. The plasticizers serve as to impart flexibility, workability, or stretchability to the resin pellets. The mold injection apparatus 11 is also used for heating these resin pellets such that the resin pellets are in a molten state. The molten state allows the resin to be injected into the mold cavities 16 of the die assembly 12.

The resin pellets includes thermoplastic material or thermosetting material. The thermoplastic material, also known as thermo-softening plastic, refers to a polymer that turns to a liquid when heated and turns to a glassy state when cooled sufficiently. The thermoplastic polymers can be melted and be molded repeatedly. Most thermoplastics are provided as high-molecular-weight polymers that have chains associate through weak Van der Waals forces as found in polyethylene, through stronger dipole-dipole interactions and hydrogen bonding as found in nylon, or through stacking of aromatic rings as found in polystyrene. The thermoplastic material often has reinforcing fibers produced from ceramic fibers, inorganic fibers, metallic fibers, or organic fibers. In contrast, the thermosetting material, also known as a thermoset plastic, refers to a polymer material that irreversibly cures. The cure may be done through heat that is generally above 200 degree Celsius, through a chemical reaction such as a two-part epoxy, or through irradiation such as electron beam processing.

In one example of the resin pellets, the resin pellets are primarily formed from polypropylene and have a length of about 2 to about 100 millimeters. The resin pellets have, in an amount of about 20% to about 80% by weight, reinforcing fibers, which have a length essentially equal to that of the resin pellets and are arranged essentially in parallel. In a case of a mixture of the resin pellets with other pellets not containing reinforcing fibers, the mixture often has reinforcing fibers in an amount of about 5% to about 70% by weight, preferably about 5% to about 60% by weight.

The injection head insert 30 is intended for engaging the mold injection apparatus 11 that provides the molten resin.

The molten resin is intended for transmitting from the mold injection apparatus 11 through the runner 32 of the runner insert 26, through the runners 17, and through the runner outlets 17 to the mold cavities 16.

The mold cavities 16 are used for receiving the molten resin and for forming the received molten resin into a pre-determined shape. The formed resin solidifies when sufficiently cooled to form moldings or products. In the open position, the stationary die 13 is positioned apart from the moveable die 14 such that the finished moldings can be removed. The ejector pins 24 are used for removing the finished moldings by urging the finished moldings out of the open die assembly 12.

The control unit 50 controls the hydraulic pistons 25. The control unit 50 has a sequence control circuit, such as a digital sequencer, which can be programmed to move the moveable cores 18. In particular, the hydraulic pistons 25 can position its respective wedges 22 towards the lifting block 23 or away from the lifting block 23.

When the wedges 22 are positioned towards the lifting block 23, the wedges 22 exerts a pressure force on the lifting block 23 to move the lifting block 23 together with the moveable cores 18 towards the stationary die 13. The moveable cores 18 then assume the reduced volume position. In this position, the hydraulic pistons 25 exert forces that are transmitted via the wedges 22, via the lifting block 23, and via the moveable cores 18 to the molten resin in the mold cavities 16 to further compress it.

The machine bed 33 is intended for supporting and for fixing the stationary parts of the injection-molding machine 10 and the stationary parts of the mold injection apparatus 11.

In one implementation, inclined surfaces 27 of two wedges 22 are inclined at an angle of about 3 degrees, as illustrated in FIGS. 7 and 8. Two piston rods 31 exert a pressure on these two wedges 22. The pressure on each wedge 22 extends over a circular area with a diameter of 25 millimeters. This area corresponds to an area of 4.91 cm$^2$ (centimeter square). This pressure in turn exerts a force on a molding of a die assembly over a projected area of 1.9 cm$^2$.

Assuming that each piston rod 31 exerts a pressure of 80 bar on the wedge 22 and assuming no frictional loss, each wedge 22 would then transmit a force of 75538 Newton=[80× 10×4.91/(tangent of 3 degrees)] onto the moveable core 18. This then translates to a total force of 151076 Newton from the two wedges 22 on the molding or to a total pressure of 7951 bar on the molding. This calculated pressure is higher than 900 bars, which is the maximum that most injection machines of the prior art can produce.

One method of using the injection-molding machine 10 is described below.

The method includes a step of closing the die assembly 12 such that the moveable die 14 presses the stationary die 13 to form the mold cavities 16.

The mold injection apparatus 11 receives resin pellets. A screw mechanism of the mold injection apparatus 11 then kneads and plasticize the resin pellets. The resin pellets are also uniformly mixed. During the kneading and the plasticizing process, the resin pellets are heated such that the resin pellets in the mold injection apparatus 11 become molten.

The molten resin is then extruded or is forced into the runners 17 of the die assembly 12. The forcing also pushes the molten resin into the channels 17 for delivering into the mold cavities 16.

At the same time or a short time afterwards, as controlled by the control unit 50, the piston rods 31 move the wedges 22 away from the lifting block 23 to allow the moveable cores 18 to move to the normal volume position. When the molten resin flows out the channels 17, the pressure of the molten resin in the mold cavities 16 may push the moveable cores 18 farther away from the stationary die 13 thereby bringing the moveable cores 18 into the normal volume position. The molten resin may completely fill the mold cavities 16 in this state.

After this, the control unit 50 controls the piston rods 31 to bring the moveable cores 18 into the reduced volume position. This is accomplished by the piston rods 31 moving the wedges 22 toward the lifting block 23. This in turn pushes the lifting block 23 towards the stationary die 13. The moveable cores 18 together with the lifting block 23 are then positioned nearer to the stationary die 13.

In the reduced volume position, the moveable cores 18 also block the channels 17 and stop the molten resin from entering into the mold cavities 16.

In addition, in this position, the molten resin is moved away from a separation line or area that is defined by the die assembly 12. In the closed position, the moveable die 13 is placed directly next to the stationary die 12 such that both dies 12 and 13 defines the said separation line. The separation line often has an area for holding a thin layer of excess resin material, which is also called a burr or flash. The moving of the resin away from the separation line reduces or eliminates the formation of the said excess material on the resin or molding.

The blocking of the channels 17 by the moveable cores 18 has an advantage of allowing the molten resin to take up essentially the entire pressure of the moveable cores 18 without pressure getting lost back into the channels 17. In other words, the exerting forces of the moveable cores 18 are efficiently transmitted to the molten resin with no or little losses. This is especially beneficial for a molten resin that is rather stiff. This manner of blocking is also very simple to design and easy to implement, since no additional moving parts are used. This is unlike other implements that use additional plungers or valves to block a flow of molten resin.

An extruder of a mold injection apparatus is often used to force the molten resin in the mold cavity of the injection-molding machine. The compression of the moveable core 18 does not push the molten resin back into the extruder. In contrast, the moveable core may high pressure that exceeds the pressure of the extruder.

The reduction of the volume of the mold cavities 16 also urges the mold cavities 16 to be completely filled with the molten resin. Put differently, the molding surface of the mold cavities 16 would have close contact with the molten resin. Mold cavities with small features or mold cavities that are thin may not be easily filled completely with the molten resin. The pressure of the cavity reduction would help to reduce or to remove this incomplete filling. Thus, a more consistent complete filling of the mold cavities 16 is ensured.

In short, measurement of amount of injected material by position of actuating device is very accurate because voids or gaps in the injected resin are closed or are removed by the pressure of the compression. Hence, this method can produce final products that are very dense.

After this, the molten resin is cooled. Cooling fluid, such as water or oil, may be transferred to a cooling chamber of the die assembly 12 to cool the molten resin. Such a cooling chamber is not shown in the figures.

When the resin has solidifies sufficiently to form the desired molding, the control unit 50 controls the piston rods 31 to bring the moveable cores 18 back into the normal volume position. The die clamping moveable plate is also actuated to move the die assembly 12 back to the opened position, wherein the stationary die 13 is separated from the moveable die 14. The ejector actuation plate is then activated to move the ejector pins 24 to remove the finished moldings out of the die assembly 12.

The finished moldings then drop into a bin or container that is provided under the injection-molding machine 10. A robotic arm may also pick up the falling finishing moldings for transferring to the bin.

FIG. 9 shows an embodiment of the compression mechanism of FIG. 7. The hydraulic pistons 25 are connected to the control unit 50 via hydraulic lines that includes pressure sensors 34. The wedges 22 have movement sensors 51, which are also connected to the control unit 50. Alternatively or in addition, pressure sensors may be provided at the hydraulic pistons 25 at an end of the moveable core 18 or in the mold cavity, for example.

The pressure sensors 34 are used for measuring pressure exerted by the wedges 22 on the lifting block 23. The movement sensors 51 are used for measuring movements or positions of the wedges 22. Readings of the sensors 34 and 51 are transmitted to the control unit 50, wherein the control unit 50 uses these readings for controlling the hydraulic pistons 25 and for controlling the mold injection apparatus 11.

The pressure readings provide an indication of the pressure exerted on the molten resin within the mold cavity. The pressure is transmitted from the wedges 22 to the moveable core 18 and to the molten resin within the mold cavity. In contrast, the movement readings are used to provide an indication of the volume of the molten resin within the mold cavity.

A pre-determined pressure of the wedges 22 corresponds to a molding pressure, wherein the molding pressure refers to a pressure of the molten resin within the mold cavity that is needed to form the molten resin.

One method of using the compression mechanism for the injection-molding machine 10 is shown a flow chart 55 of FIG. 10.

The flow chart 55 shows, a step 58 of closing the die assembly 12. After this, the amount or volume of molten resin for injecting into the mold assembly 12 is determined, in a step 61. The molten resin of the determined volume is later injected into the closed mold assembly 12, in a step 64.

The control unit 50 then advances the moveable core 18 by a predetermined distance, in a step 67. The advancement is achieved by controlling the hydraulic pistons 25 to exert pressure on the wedges 22 in which the pressure causes the moveable core 18 to advance. The pressure is transmitted from the wedges 22 to the lifting block 23 and to the molten resin within the mold cavity.

In a generic sense, the molten resin can be injected into the closed mold assembly 12 via an outlet of a runner that receives the molten resin from a mold injection apparatus via an extruder. The moveable core 18 may close the outlet such that the pressure exerted on the molten resin be increased above the pressure of the extruder.

The pressure sensors 34 later measure the pressure that causes the advancement of the moveable core 18, in a step 70. This measured pressure value is then transmitted to the control unit 50. Afterward, the measured pressure value is compared with a pre-determined maximum pressure value, in a step 73. If the measured pressure value is not greater than or is equal to the maximum pressure value, the step 67 of advancing the moveable core 18 is performed again. The step 67 is repeated until the measured pressure value is greater than or is equal to the maximum pressure value.

On the other hand, if the measured pressure value is greater or is equal to the maximum pressure value, the movement sensor 51 then measures the advancement of the moveable core 18 corresponding to the maximum pressure value, in a step 76. The measured advancement is later transmitted to the control unit 50.

The measured advancement is afterward compared with a desired advancement value, in a step 79. The measured advancement provides an indication of the volume of the molten resin in the die assembly 12. If the measured advancement is not essentially the same as a desired advancement, the amount or the volume of the next molten resin for injecting is adjusted, in a step 82. The step 64 of injecting the molten resin is then repeated.

The measured advancement provides feedback data, which can be used to control accurately the volume of the injected molten resin within the mold cavity. This implementation is different from other implementation that focuses on accurate injecting of molten resin without data from a molding machine.

FIG. 11 shows a bi-injection molding machine 90. The bi-injection molding machine 90 and the injection-molding machine 10 of FIG. 1 have similar parts. The similar parts have the same name or the same reference number with an alphabet symbol.

The bi-injection molding machine 90 includes a die assembly 12 that operates with a first mold injection apparatus and with a second mold injection apparatus. The first and the second mold injection apparatuses are fixed to a machine bed and they are not shown in FIG. 11.

The die assembly 12 includes a stationary die 13 and a moveable die 14, which together define two internal mold cavities 16 when the die assembly 12 is in a closed position.

The stationary die 13 and the moveable die 14 also comprise grooves that form a plurality of inner channels 17A and a plurality of outer channels 17B when the die assembly 12 is in the closed position. The inner channels 17A are also called inner runners while the outer channels 17B are also called outer runners. As seen in FIG. 11, the channels 17A are located at a predetermined distance from the channels 17B. Put differently, the channel 17A is not placed inside the channel 17B. The channel 17B is not placed inside the channel 17A.

The stationary die 13 is placed next to a first major surface of a stationary cavity plate 15, which also removably takes up and receives the cavity plate 15. Both the cavity plate 15 and the stationary die 13 have openings for taking up an inner runner insert 26A and outer runner inserts 26B.

The inner runner insert 26A is placed in an inner portion of the cavity plate 15 and it has a hollow core, which serves as a runner 32A. The runner 32A is connected to the inner channels 17A of the die assembly 12. First ends of the inner channels 17A are adapted to receive molten resin from the first mold injection apparatus through the runner 32A while second ends of the inner channels 17A are connected to the respective cavity 16 via an outlet 21A, which terminate at an outlet orifice in the stationary die 13. The outlet 21A can be seen in FIG. 12.

Similarly, the outer inserts 26B are placed in outer portions of the cavity plate 15 and they each have a hollow core, which serves as a runner 32B, as can be seen in FIG. 11. The runner 32B is connected to the outer channels 17B of the die assembly 12. First ends of the outer channels 17B are adapted to receive molten resin from the second mold injection apparatus through the runner 32B while second ends of the outer channels 17B are connected to the respective cavity 16 via an outlet 21B, which terminate at an outlet orifice in the stationary die 13. The outlet 21B can be seen in FIG. 12.

A second major surface of the cavity plate 15 is placed next to and is attached to a first major surface of a first stationary clamping plate 28A, as seen in FIG. 11. The second major surface of the cavity plate 15 is located opposite to the first major surface of the cavity plate 15. In a similar manner, a second major surface of the first stationary clamping plate 28A is placed next to and is attached to a first major surface of a second stationary clamping plate 28B. The second major surface of the second stationary clamping plate 28A is located opposite to its first major surface. A second major surface of the set of clamping plates 28B, which is opposite to the first major surface of the clamping plate 28B, is placed next to and is attached to an injection head insert 30. The injection head insert 30 has a central opening that is aligned with a central opening in the clamping plate 28B.

The clamping plate 28B is fixed to a machine bed 33. The first and the second mold injection apparatuses are also fixed to the same machine bed 33.

With reference to the moveable die 14, it has multiple hollow cores in which longitudinally moveable cores 18 and longitudinally moving ejector pins 24 are inserted.

The moveable cores 18 are attached to a moving apparatus 19. The moveable cores 18 are also inserted inside a core plate 20 that is adapted to keep the longitudinal axe of the moveable cores 18 essentially horizontal and essentially parallel to each other while allowing the moveable cores 18 to move.

The ejector pins 24 are attached to a superior ejector plate 44, which acts as an ejector actuation plate. An inferior ejector plate 42, which is secured to the base clamp plate 38, blocks the superior ejector plate 44. The ejector pins 24 are inserted in hollow cores of an intermediary plate 36, in hollow cores of a lifting block 23, in hollow cores of a moveable die receptacle that is provided by the core plate 20, and in hollow cores of the moveable die 14.

According to the application, the arrangement with ejector pins 24 that is shown in FIGS. 12 and 13 can also be used in the embodiments of the preceding FIGS. 1 to 10.

Operationally, the die assembly 12 is moveable between an open position and a closed position. The moveable cores 18 are moveable between a reduced volume position and a normal volume position, being actuated in both direction by the moving apparatus 19.

When the die assembly 12 is in the closed position and when the moveable cores 18 are in the normal volume position, the moveable cores 18 do not block the outlets 21A of the inner channels 17A and the outlets 21B of outer channels 17B of the die assembly 12.

When the moveable cores 18 shift to the reduced volume position, the moveable cores 18 block and cover the outlets 21A of the inner channels 17A and the outlets 21B of the outer channels 17B of the die assembly 12. This is done such that any molten resin within the outlets 21A and the outlets 21B are in contact with circumferential surface of the moveable cores 18. The blocking prevents the molten resin within the inner channels 17A and the molten resin within the outer channels 17B of the die assembly 12 from flowing into the mold cavities 16. In this reduced volume position, the moveable cores 18 also reduce the volume of the die cavities 16, thereby compressing the molten resin, which is take up therein.

In use, the first and second mold injection apparatuses are used for receiving resin pellets. The first and second mold injection apparatuses heat these resin pellets such that the resin pellets are in a molten state, which allows the resin to be injected into the mold cavities 16 of the die assembly 12.

The molten resin from the first mold injection apparatus is intended for transmitting from the first mold injection apparatus through the runner 32A, through the inner channels 17A, and through the runner outlets 21A of the die assembly 12, to the mold cavities 16. Similarly, the molten resin from the second mold injection apparatus is intended for transmitting from the second mold injection apparatus through the runner 32B, through the outer channels 17B, and through the runner outlets 21B of the die assembly 12, to the mold cavities 16.

In the open position, the stationary die 13 is positioned apart from the moveable die 14 such that the finished moldings can be removed. The ejector pins 24 are used for removing the finished moldings by urging the finished moldings out of the open die assembly 12.

One possible method of using the bi-injection molding machine 19 includes a step of closing the die assembly 12 such that the moveable die 14 presses the stationary die 13 to form the mold cavities 16.

The first mold injection apparatuses receives first resin pellets while a screw mechanism of the first mold injection apparatus kneads and plasticize the received first resin pellets. These first resin pellets are also heated such that the first resin pellets become molten. Likewise, the second mold injection apparatus receives second resin pellets, which is different from the first resin pellets. A screw mechanism of the second mold injection apparatus then kneads and plasticize the received second resin pellets. These second resin pellets are also heated such that the second resin pellets become molten.

This is followed by a step of injecting the molten first resin within the first mold injection apparatus into the die assembly 12 for forming a first layer of resin.

The moveable cores 18 are moved to the normal volume position. The molten first resin of the first mold injection apparatus is afterward extruded into the inner channels 17A of the die assembly 12. The molten first resin flows from the first mold injection apparatus, via the runner 32A, via the inner channels 17A, via the outlet 21A, to the mold cavities 16. After this, the moveable cores 18 are moved into the reduced volume position, wherein the moveable cores 18 block the outlet 21A of the inner channels 17A of the die assembly 12. This stops the molten first resin within the inner channels 17A from entering into the mold cavities 16. This blocking of the inner channels 17A also allows the molten first resin within the mold cavities 16 to take up essentially the entire pressure of the moveable cores 18 without any pressure getting lost back into the inner channels 17A. By this, the first resin forms the first layer of resin.

Later, this is followed by a step of injecting the molten second resin within the second mold injection apparatus into the die assembly 12 for forming a second layer of resin that is next to the first layer of resin.

The moveable cores 18 are then moved back to the normal volume position. The molten second resin of the second mold injection apparatus is then extruded into the outer channels 17B of the die assembly 12. The molten second resin flows from the second mold injection apparatus, via the runner 32B, via the outer channels 17B, via the outlet 21B, to the mold cavities 16. The moveable cores 18 are then moved into the reduced volume position, wherein the moveable cores 18 block the outlet 21B of the outer channels 17B of the die assembly 12, thereby stopping the molten second resin in the outer channels 17B from entering into the mold cavities 16. This blocking of the outer channels 17B also enables the molten second resin in the mold cavities 16 to take up essentially the entire pressure of the moveable cores 18 without pressure getting lost back into the outer channels 17B. In effect, the molten second resin of the second mold injection apparatus is pressed against the first resin of the first mold injection apparatus, which presses then against the mold cavities 16. Put differently, the second resin within the mold cavity 16 forms the second layer of resin that is next to the first layer of resin.

After this, the first layer of resin and the second layer of resin within the die assembly 12 are cooled. Cooling fluid, such as water or oil, may be transferred to a cooling chamber of the die assembly 12 to cool the molten first resin and the molten second resin. In a similar way, further resin layers may be added. The further resin layers may comprise alternating layers of the first and second resin, for example. The different resin layers are indicated in FIG. 12, which shows five resin layers.

The ejector pin 24 is positioned with its groove in the last resin layer that is molded last in a final molding step. During the final molding step, the ejector pin 24 is advanced into the last resin layer and the ejector is taken up in the last layer.

When the first resin and the second resin have solidified sufficiently, the moveable cores 18 are moved back into the normal volume position and the die assembly 12 is actuated to the opened position. The ejector pins 24 are later actuated to remove the finished moldings out of the die assembly 12. During the removal of the finished molding, the ejector pin 24 sticks to the last resin layer and the molded layers are moved out together with the ejector pin 24. During removal, the circular groove 43 of the ejector pin 24 improves the adhesion of the ejector pin 24 to the last resin layer. After removal, the ejector pin 24 can be broken loose from the molded plastic part by a turning movement of the ejector pin 24, for example.

FIG. 13 shows a sidewall 93 of the mold cavity 16 and a top surface 91 of the moveable core 18, wherein the sidewall 93 is rough and the top surface 91 is smooth. During production of the finished molding, when the moveable core 18 is moved away from the reduced volume position to the normal volume position, the rough sidewall 93 holds or retains a layer of resin within the mold cavity 16. In contrast, the smooth top surface 91 of the moveable core 18 allows the moveable core 18 to detach easily from the layer of resin.

In a general sense, the method steps of FIG. 10 may or may not be applied. This means that one can perform the steps of molding the first resin and the second resin by compression molding with increased pressure or not with the increased pressure. These steps can also be performed with feedback information of the injected material or not with the feedback information.

This method allows a molded part with multiple layers to be produced. The multiple layers have different properties, such as color, conductivity, resistivity, for producing various parts. The layers can include a polymer with different fillers for providing the different properties. In one implementation, the molded part is provided as a capacitor, wherein one of its layers includes dielectric fillers to serve as an insulator. This layer is adjacent to two layers with conductive fillers to serve as conductors. In other implementation, the molded part is provided as a resistor. The resistor includes layers that include resistive fillers.

The compression of the resin enables the molded part to have a uniform density. This is especially important when the molded part acts as an optical lens. The uniform density allows the optical lens to have a uniform optical relative index. Furthermore, the molded part can include two layers in which each of the both layers has a uniform density. Such a lens can be used to provide a progressive lens for users with presbyopia.

Although the above description contains much specificity, this should not be construed as limiting the scope of the embodiments but merely providing illustration of the foreseeable embodiments. The above stated advantages of the embodiments should not be construed especially as limiting the scope of the embodiments but merely to explain possible achievements if the described embodiments are put into practice. Thus, the scope of the embodiments should be determined by the claims and their equivalents, rather than by the examples given.

The embodiments can also be described with the following lists of elements being organized into items. The respective combinations of features which are disclosed in the item list are regarded as independent subject matter, respectively, that can also be combined with other features of the application.

REFERENCE NUMBERS

10 injection-molding machine
11 mold injection apparatus
12 die assembly
13 stationary die
14 moveable die
15 cavity plate
16 cavity
17 channel
17A inner channel
17B outer channel
18 moveable core
19 moving apparatus
20 core plate
21 outlet
21A outlet
21B outlet
22 wedge
23 lifting block
24 ejector pin
25 hydraulic piston
26 runner insert 27 inclined surface
28 clamping plate
29 inclined surface
30 injection head insert
31 piston rod
32 runner
33 bed
34 pressure sensor
36 intermediary plate
38 base clamp plate
39 knee lever mechanism
40 support ring
41 hydraulic piston
42 inferior ejector plate
43 circular groove
44 superior ejector plate
45 central opening
47 central opening
50 control unit
51 movement sensor
55 flow chart
58 step
61 step
64 step
67 step
70 step
73 step
76 step
79 step
82 step
90 bi-injection molding machine
91 top surface
93 sidewall

The invention claimed is:

1. A method of producing an injection molding comprising
injecting a predetermined volume of a molten resin into an internal cavity of a die assembly, wherein the molten resin flows into the internal cavity via an outlet of a resin channel,
advancing a moveable core into the internal cavity by a pre-determined distance, such that the volume of the internal cavity is reduced,
measuring the pressure being applied to the molten resin, and
repeating the advancing of the moveable core and the measuring of the pressure when the measured pressure is less than a pre-determined pressure;
wherein the advancing of the moveable core is done such that the moveable core closes the outlet of the resin channel.

2. The method according to claim 1, wherein
after the molten resin being injected into the internal cavity, the moveable core is advanced such that the volume of the internal cavity is reduced.

3. The method according to claim 1, wherein
the moveable core advances while the molten resin is being injected into the internal cavity.

4. The method according to claim 1, wherein
the volume of molten resin being injected into the internal cavity of the die assembly is adjusted according to positional data of the moveable core.

5. The method according to claim 1, further comprising:
measuring a position of the moveable core; and
adjusting the predetermined volume of a molten resin for a subsequent injecting when the position of the moveable core is different from a pre-determined position of the moveable core.

6. The method according to claim 1, further comprising:
adjusting the predetermined volume of a molten resin for a subsequent injecting when the pressure that is applied to the molten resin is different from the pre-determined pressure.

7. A method of producing an injection molding comprising
providing a layer of first resin and
providing a layer of second resin that is provided next to the first resin layer,
wherein the providing of the layer of first resin comprises
injecting a predetermined first volume of a molten first resin into an internal cavity of a die assembly, wherein the molten first resin flows into the internal cavity via a first outlet of a first resin channel,
forming the layer of first resin by advancing a moveable core into the internal cavity to apply a pre-determined first pressure on the molten first resin, such that the volume of the internal cavity is reduced, the advancing of the moveable core is done such that the moveable core closes the first outlet of the first resin channel, and
measuring a first position of the moveable core,
wherein the providing of the layer of second resin comprises
injecting a predetermined second volume of a molten second resin into the internal cavity of the die assembly, wherein the molten second resin flows into the internal cavity via a second outlet of a second resin channel,
forming layer of second resin by advancing the moveable core into the internal cavity to apply a pre-determined second pressure on the molten second resin, such that the volume of the internal cavity is reduced, the advancing of the moveable core is done such that the moveable core closes the second outlet of the second resin channel, and
measuring a second position of the moveable core,
the method further comprises,
adjusting the predetermined first volume of the molten first resin for a subsequent injecting when the position of the moveable core is different from a pre-determined first position, and
adjusting the predetermined second volume of the molten second resin for a subsequent injecting when the position of the moveable core is different from a pre-determined second position.

8. The method according to claim 7, wherein the application of the pre-determined first pressure on the molten first resin comprises:
advancing the moveable core by a pre-determined distance,
measuring the pressure being applied to the molten first resin, and
repeating the advancing of the moveable core and the measuring of the pressure when the measured pressure is less than the pre-determined first pressure.

9. The method according to claim 7, wherein the application of the pre-determined second pressure on the molten second resin comprises:
advancing the moveable core by a pre-determined distance,
measuring the pressure being applied to the molten second resin, and
repeating the advancing of the moveable core and the measuring of the pressure when the measured pressure is less than the pre-determined second pressure.

10. A method of producing an injection molding comprising
providing a layer of first resin and
providing a layer of second resin that is provided next to the first resin layer,
wherein the providing of the layer of first resin comprises
injecting a predetermined first volume of a molten first resin into an internal cavity of a die assembly, wherein the molten first resin flows into the internal cavity via a first outlet of a first resin channel, and
forming the layer of first resin by advancing a moveable core by a pre-determined distance into the internal cavity, such that the volume of the internal cavity is reduced, the advancing of the moveable core is done such that the moveable core closes the first outlet of the first resin channel, measuring the pressure being applied to the molten first resin, and repeating the advancing of the moveable core, and the measuring of the pressure when the measured pressure is less than a pre-determined first pressure; and
wherein the providing of the layer of second resin comprises
injecting a predetermined second volume of a molten second resin into the internal cavity of the die assembly, wherein the molten second resin flows into the internal cavity via a second outlet of a second resin channel, and
forming the layer of second resin by advancing the moveable core by a pre-determined distance into the internal cavity, such that the volume of the internal cavity is reduced, the advancing of the moveable core is done such that the moveable core closes the second outlet of the second resin channel, measuring the pressure being applied to the molten second resin, and repeating the advancing of the moveable core, and the measuring of the pressure when the measured pressure is less than a pre-determined second pressure.

11. The method of claim 10, further comprising:

after forming the layer of first resin, measuring a first position of the movable core;

after forming the layer of second resin, measuring a second position of the movable core;

adjusting the predetermined first volume of the molten first resin for a subsequent injecting when the first position of the moveable core is different from a pre-determined first position, and adjusting the predetermined second volume of the molten second resin for a subsequent injecting when the second position of the moveable core is different from a pre-determined second position.

* * * * *